United States Patent
Nukui et al.

[19]

[11] Patent Number: 5,945,661
[45] Date of Patent: Aug. 31, 1999

[54] DATA SYMBOL READER AND METHOD INCLUDING DATA SYMBOL POSITION EVALUATION

[75] Inventors: Makoto Nukui; Shuzo Seo; Takeharu Shin; Nobuhiro Tani; Yukihiro Ishizuka, all of Tokyo, Japan

[73] Assignee: Asahi Kogaku Kogyo Kabushiki Kaisha, Tokyo, Japan

[21] Appl. No.: 08/660,193

[22] Filed: Jun. 3, 1996

[30] Foreign Application Priority Data

Jun. 2, 1995 [JP] Japan ................................... 7-159924

[51] Int. Cl.⁶ .................................................. B06K 7/10
[52] U.S. Cl. .................... 235/472; 235/454; 235/462.08; 235/462.09; 235/462.1; 235/462.11; 235/462.2
[58] Field of Search ..................... 235/472, 462, 235/454, 462.08, 462.09, 462.1, 462.11, 462.2

[56] References Cited

U.S. PATENT DOCUMENTS

| | | | |
|---|---|---|---|
| 4,578,571 | 3/1986 | Williams | 235/472 |
| 4,730,104 | 3/1988 | Rogers | 364/425 |
| 5,107,100 | 4/1992 | Shepard et al. | 235/472 |
| 5,140,141 | 8/1992 | Inagaki et al. | 235/462 |
| 5,308,966 | 5/1994 | Danielson et al. | 235/472 |
| 5,414,251 | 5/1995 | Durbin | 235/472 |
| 5,428,212 | 6/1995 | Tani et al. | 235/472 |
| 5,430,283 | 7/1995 | Tanaka | 235/462 |
| 5,457,307 | 10/1995 | Dumont | 235/472 |
| 5,500,516 | 3/1996 | Durbin | 235/462 |

FOREIGN PATENT DOCUMENTS 0292484  11/1989  Japan ..................................... 235/462

OTHER PUBLICATIONS

Data Entering System, J.E. Jones and P.V. McEnroe, IBM Technical Disclosure Bulletin, vol. 14 No. 5, Oct. 1971.
United Kingdom Search Report. Jun. 1996.

Primary Examiner—Donald Hajec
Assistant Examiner—Douglas X. Rodriguez
Attorney, Agent, or Firm—Greenblum & Bernstein P.L.C.

[57] ABSTRACT

A data symbol reading device has a casing which includes a hand grip and a head part. The casing includes signal processing circuits, a light source, an image sensing device, and an optical system. The optical system directs light reflected from a symbol reading area such that an image is formed on a light receiving surface of the image sensing device. An indication unit, comprised of five LEDs, is provided on an easily visible surface of the casing. If, in the reading process, it is determined that a data symbol is fully within the symbol reading area, a central LED is illuminated. However, if the data symbol is protruding outside the symbol reading area, one or more LEDs are illuminated to indicate the direction of protrusion.

32 Claims, 11 Drawing Sheets

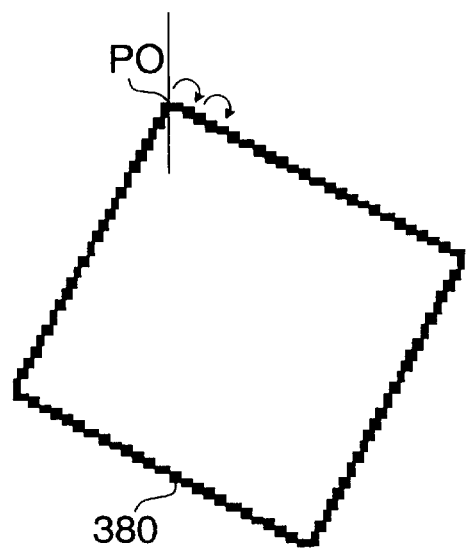
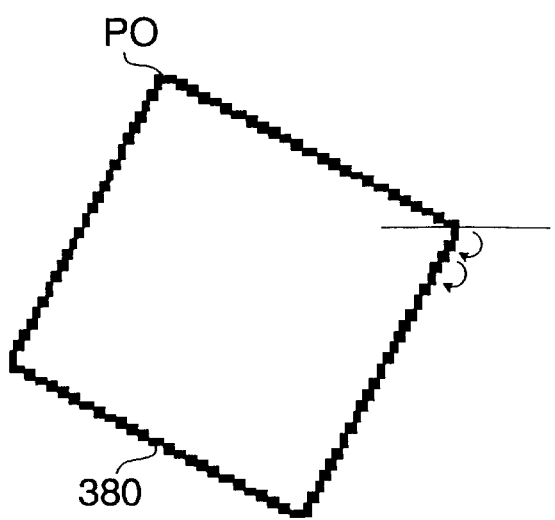
FIG. 6A          FIG. 6B
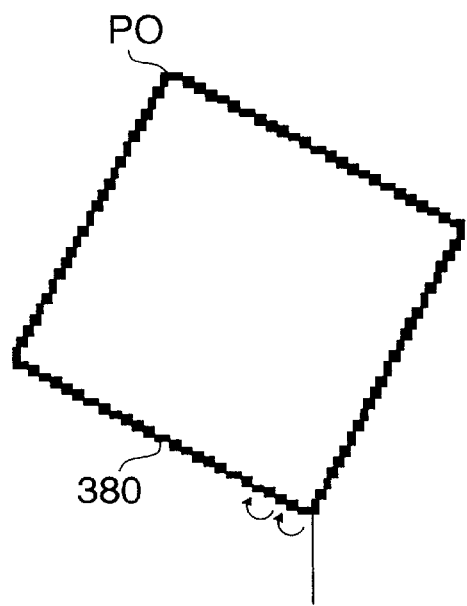
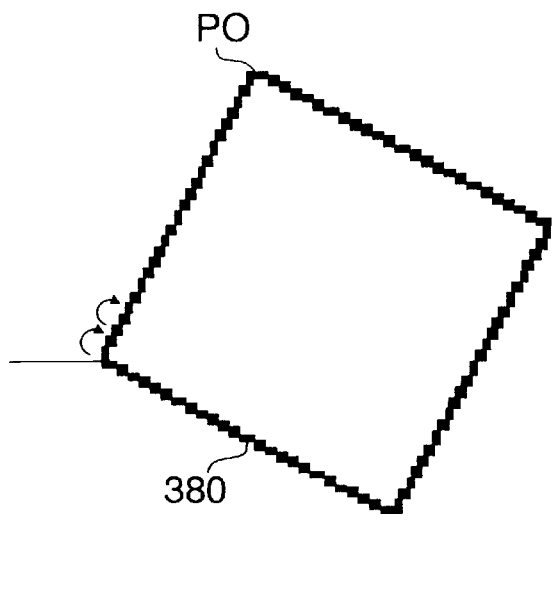
FIG. 6C          FIG. 6D

DATA SYMBOL READER AND METHOD INCLUDING DATA SYMBOL POSITION EVALUATION

BACKGROUND OF THE INVENTION

The present invention relates to a data symbol reading device for reading coded information such as two-dimensional data symbols.

Bar codes, and associated methods and devices for coding and reading bar code information, have come to be widely used for applications such as point-of-sale (POS) systems. However, since bar codes are in a one-dimensional format, in which the coding and reading of data are based on a one dimensional arrangement of bars, such systems are limited in terms of the amount of information that can be coded and read.

Data symbols, in which a mosaic or tessellated pattern is arranged in, for example, a black and white, two-dimensional symbol, have been developed in order to hold more information. Appropriate coding and reading devices have also been developed for such data symbols. These reading devices may be largely classified into two groups: those in which an image sensing device or an area sensor, such as a CCD, is used to read the data symbol pattern in two dimensions simultaneously; and those in which a line sensor is used to perform a main scan of each line, and the reading device and data symbol are moved relative to each other in a direction perpendicular to the main scanning direction to perform sub-scanning, thereby reading in two dimensions.

Reading devices which use an image sensing device (i.e., an area sensor) do not require relative movement between the reading unit and the data symbol for sub-scanning, and are thus able to read data symbols in a shorter time.

A conventional data symbol reading device 100 is shown in FIG. 1. The data symbol reading device 100 has a casing 101. The casing 100 is formed from a grip part 102, which is gripped with the hand, a head part 103, and a housing 104. The head part 103 is formed at the front end of the grip part 102 and, contains a reading unit (not shown). The reading unit includes an image sensing device, an optical system and a light source. The optical unit uses light reflected from a data symbol 38 to form an image on the light receiving surface of the image sensing device. The data symbol reading device further includes a signal processing circuit (not shown) within the grip part 102 of the casing 101, for processing the image signals output from the image sensing device.

The housing 104 extends from the head part 103 towards the symbol reading area 36. The housing 104 has a rectangular front opening 105, which substantially coincides with the symbol reading area 36.

When the data symbol reading device 100 is used for reading, the grip part 102 is held with the hand, and the housing 104 is moved over the reference plane 107, so that the data symbol 38 is positioned within the front opening 105 of the housing 104 (i.e., the data symbol 38 is within the symbol reading area 36). A trigger button 106 is then pressed to start the reading operation. The light source is illuminated, and light reflected from the symbol reading area 36 passes through the optical system and forms an image on the light receiving surface of the image sensing device. The image signal output from the image sensing device is then processed and decoded by the signal processing circuit to obtain the data expressed by the data symbol 38.

However, decoding will not be performed correctly if the data symbol 38 protrudes outside the symbol reading area 36 in the positioning process described above, and a reading error will occur.

When a reading error occurs, the operator must determine the cause of the read error. However, the operator has no immediate or direct information about the cause of the error. Furthermore, even if the operator is notified of a positioning or other error, since the data symbol 38 is covered by the data symbol reading device 100, the operator cannot see the position of the data symbol 38. In such a case, the operator often is required to make a number of positional corrections, resulting in repeated reading errors, before the data symbol 38 is accurately read.

SUMMARY OF THE INVENTION

It is therefore an object of the present invention to provide an improved data symbol reading device enabling easy and rapid positioning of a data symbol reading device with respect to a data symbol.

In order to satisfy the object of the invention, a data symbol reader includes a reading unit including an image sensing device and an optical System. The optical system forms an image of a data symbol on the image sensing device when the data symbol is in a symbol reading area of the data symbol reading device. The data symbol reader further includes an evaluating device for evaluating if all of the data symbol is within the symbol reading area based on the output of the image sensing device, and an indicator, responsive to the evaluating means, for indicating whether ail of the data symbol is within the symbol reading area.

Accordingly, by indicating to the operator whether all of the data symbol is within the symbol reading area, the data symbol reader enables the operator to make a rapid and easy correction to obtain a proper symbol reading.

In one particular embodiment, the evaluating device includes an outline extracting device for extracting the outline of a data symbol image formed on the image sensing device, and wherein the evaluating device evaluates that the data symbol is contained within the symbol reading area when the extracted outline forms a closed loop and evaluates that the data symbol is not within the symbol reading area when the extracted outline does not form a closed loop In this manner, the data symbol reader recognizes a complete symbol or an incomplete symbol, the incomplete symbol being cut off by the edge of the symbol reading area.

In one particularly advantageous development of this aspect of the invention, the data symbol reader further includes a recognizing device for recognizing a direction in which the symbol protrudes from the symbol reading area when the data symbol protrudes outside the symbol reading area, and wherein the indicator includes directional indicators, responsive to the recognizing device, for indicating a direction in which the symbol protrudes from the symbol reading area.

Accordingly, the operator is provided with information regarding the direction in which the symbol protrudes, and the operator can move the data symbol reader in the appropriate direction to allow a reading of the symbol.

In this case, the direction in which the symbol protrudes from the symbol reading area may be evaluated based on an intersection of the outline of the data symbol image formed on the image sensing device and an outer frame of the effective picture element area of the image sensing device. Preferably, the data symbol is a two-dimensional data symbol.

In another aspect of the invention, a data symbol reader includes an imaging system for forming an image of a data symbol, the imaging system having an outer frame defining an effective reading area; an evaluating device for evaluating if a portion of a formed image of the data symbol coincides with the outer frame defining the effective reading area; and an indicator, responsive to the evaluating device, for indicating whether the formed image of the data symbol coincides with the outer frame defining the effective reading area.

When the formed image of the data symbol coincides with the outer frame of the effective reading area, the symbol is necessarily protruding from the symbol reading area. Accordingly, by indicating when the formed image and frame coincide, the data symbol reader indicates that a proper reading of the symbol cannot be taken, and the operator may make a correction in reader positioning according to the reading.

In a preferred embodiment, the evaluating device includes a direction detecting device for detecting directions in which the portion of the formed image of the data symbol coincides with the outer frame defining the effective reading area. The indicator includes a plurality of direction indicators, responsive to the direction detecting device, for indicating the directions in which the portion of the formed image coincides with the outer frame defining the effective reading area.

In this manner, the operator is provided with information regarding the direction in which the symbol protrudes, and the operator can move the data symbol reader in the appropriate direction to allow a reading of the symbol.

Preferably, the direction detecting device includes a memory for storing image information of at least a portion of the formed image; a memory for storing frame information, according to the directions, of the outer frame defining the effective reading area; and device for comparing the image information and the frame information. In this case, the image information may include image coordinate, and the frame information may include frame coordinates.

In a possible modification, the direction detection device detects up to two directions in which the portion of the formed image of the data symbol coincides with the outer frame defining the effective reading area, and wherein the plurality of direction indicators indicates up to two directions in which the portion of the formed image coincides with the outer frame defining the effective reading area.

Accordingly, the operator is informed to move the data symbol reader at an angle directions as well as straight up, dow, left and right.

In a particular development of the invention, the portion of the formed image of the data symbol is an outline of the data symbol. In this case, the evaluating device includes a device for extracting information defining the outline of the data symbol from the formed image of the data symbol, and the evaluating device may further evaluate whether the extracted information defining the outline of the data symbol defines a complete outline of the data symbol.

Accordingly, if the outline is incomplete, the symbol is outside the symbol reading area, and the operator is so notified via the indicator. One way of evaluating whether the extracted information defining the outline of the data symbol defines a complete outline of the data symbol is by evaluating if the outline of the symbol defines a closed loop.

In another preferred embodiment, the evaluating device further evaluates whether all portions of the formed image of the data symbol are within the outer frame defining the effective reading area; and wherein the indicator further indicates when all portions of the formed image of the data symbol are within the outer frame defining the effective reading area. In this case, the evaluating device preferably further evaluates whether all portions of the formed image of the data symbol are outside the outer frame defining the effective reading area. The indicator further indicates when all portions of the formed image of the data symbol are outside the outer frame defining the effective reading area.

Consequently, as well as indicating the direction of a protruding-symbol, the indicator also gives a positive indication for a properly positioned symbol and for no symbol at all.

According to still another aspect of the present invention, a data symbol reader includes an imaging sensor for reading an image of an effective reading area defined by an outer frame; an imaging optical system for forming the image on the imaging sensor; a memory; a controller that receives the image from the imaging sensor, stores first information representing the image of the effective reading area and second information representing a data symbol image portion of the image in the memory, and evaluates a direction in which the data symbol image portion of the image coincides with the outer frame; and an indicator having directional indications, the indicator controlled by the controller, that indicates the direction in which the data symbol image portion of the image coincides with the outer frame.

BRIEF DESCRIPTION OF THE DRAWINGS

FIGS. 6A through 6D are diagrams showing an outline extraction process for a complete outline;

DETAILED DESCRIPTION OF THE PREFERRED EMBODIMENTS

Figure 1:
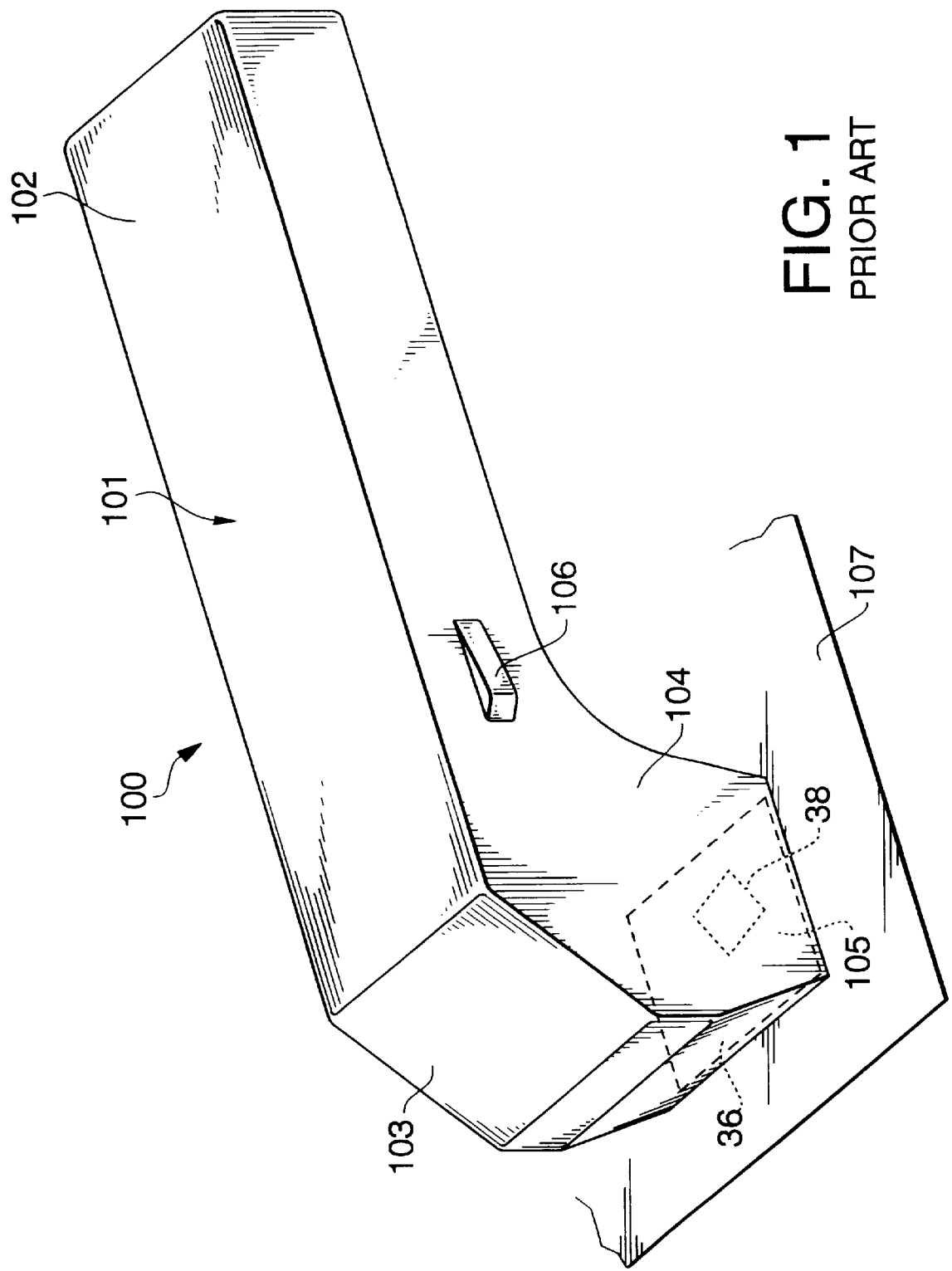
FIG. 1 is a perspective view of a conventional data symbol read device.
Figure 2:
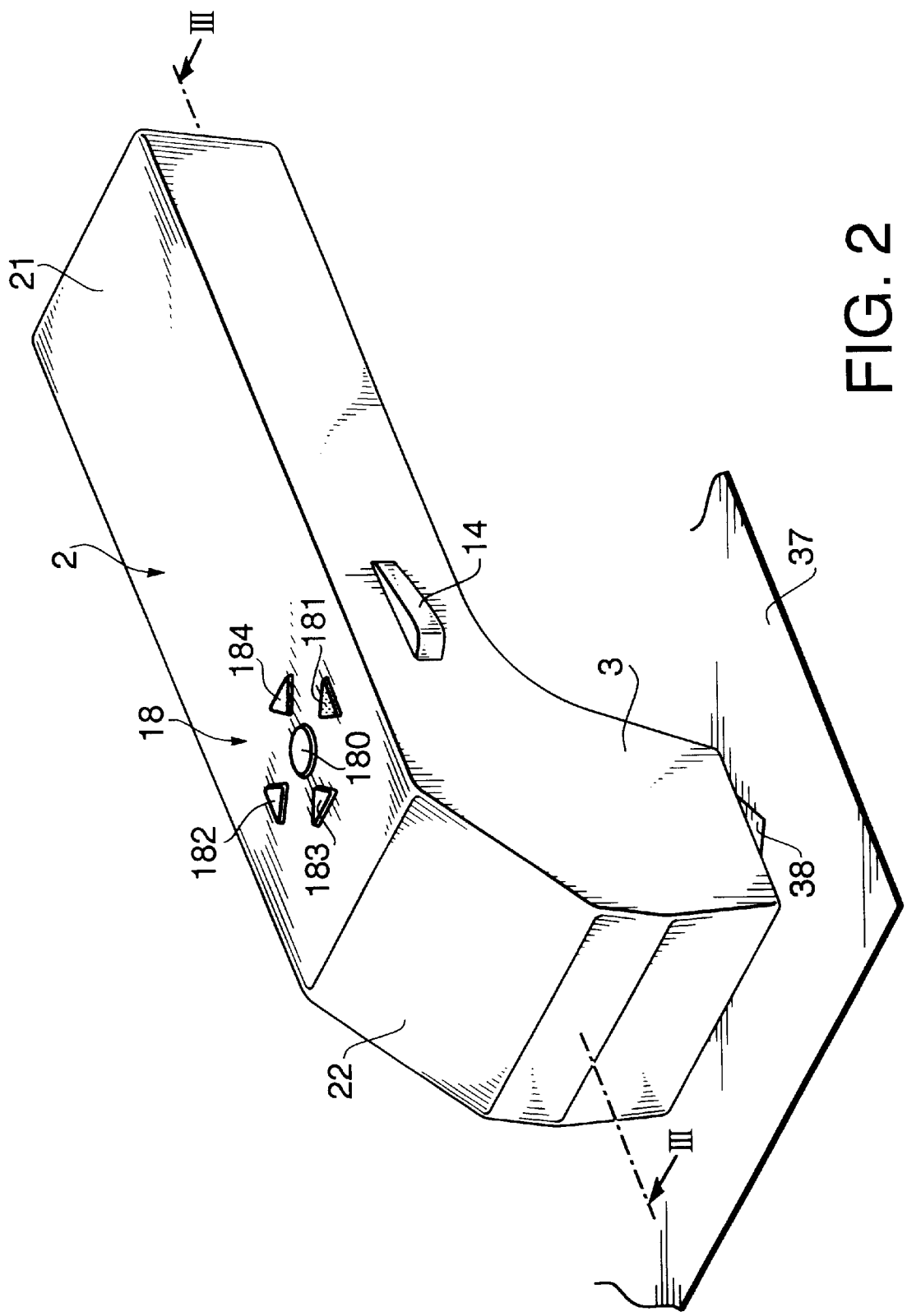
FIG. 2 is a perspective view of an embodiment of a data symbol reading device according to the invention.
Figure 3:
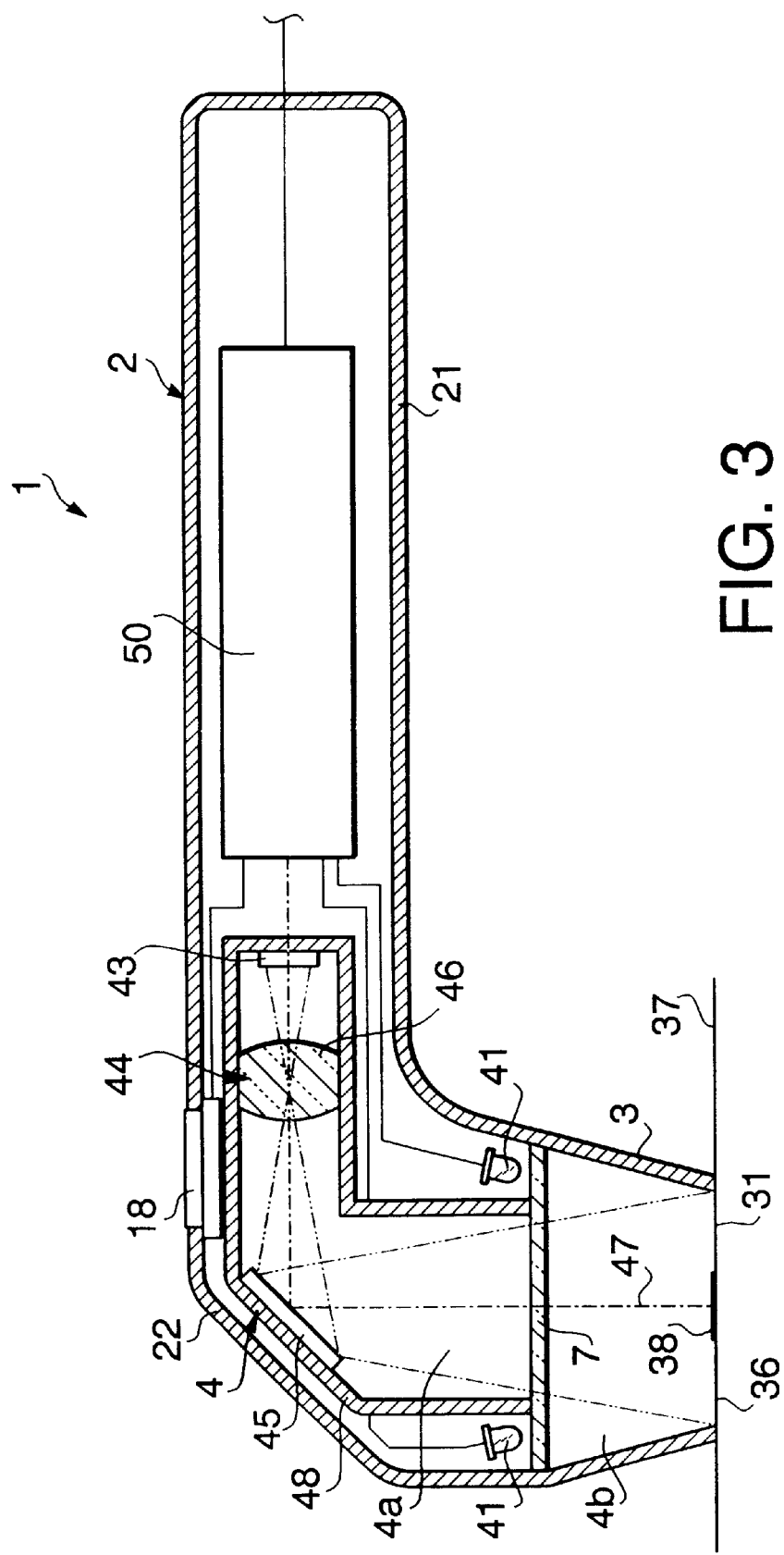
FIG. 3 is a sectional side view of the data symbol reading device of FIG. 2, taken along the line III—III of FIG. 2.
Figure 4:
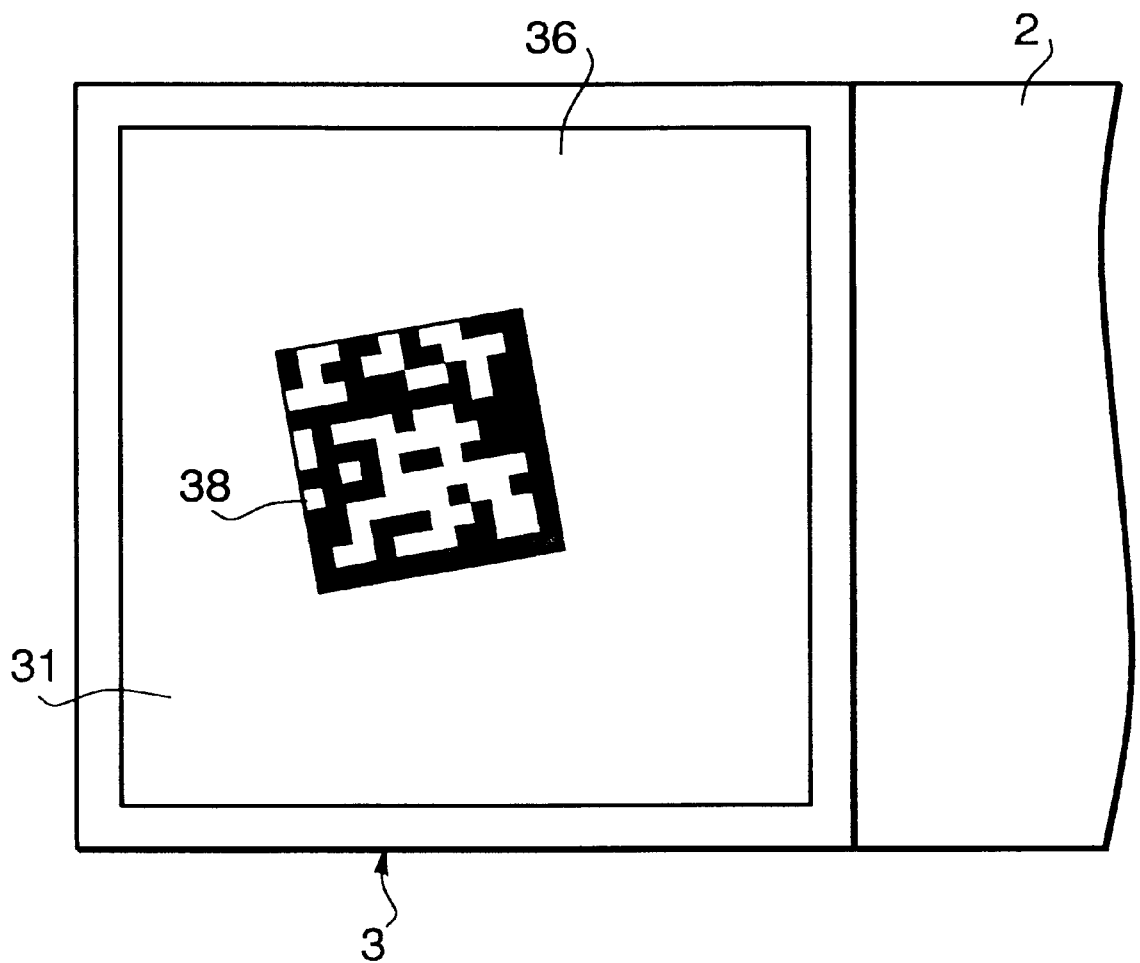
FIG. 4 is a bottom view of the housing of the data symbol reading device of FIG. 2.
Figure 5:
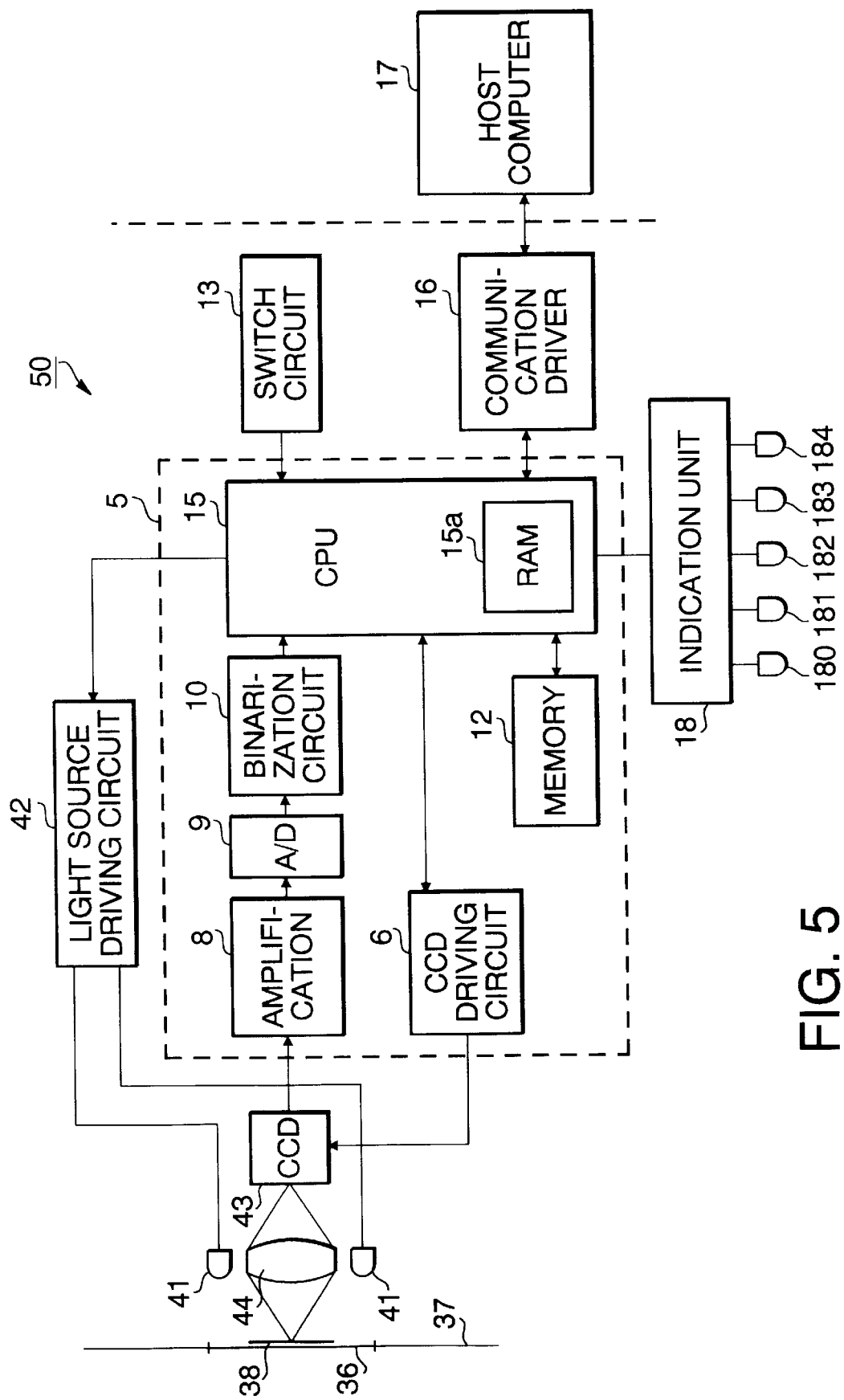
FIG. 5 is a block diagram showing a control circuit in the data symbol reading device of FIG. 2.

FIG. 2 is a perspective view of an embodiment of a data symbol reading device according to the invention, FIG. 3 is a sectional side view of the data symbol reading device shown in FIG. 2, FIG. 4 is a bottom view of the housing of the data symbol reading device shown in FIG. 2, and FIG. 5 is a block diagram of the circuit arrangement of the data symbol reading device shown in FIG. 2.

With reference to FIGS. 2 through 5, the data symbol reading device 1 according to the invention has a casing 2 including a grip part 21 and a head part 22. The head part 22 is formed at the end of the grip part 21. The casing 2 houses a reading unit 4, and a control circuit 50. As shown in FIG. 5, the control circuit 50 includes a signal processing circuit 5, a light source driving circuit 42, and a communication driver 16.

The exterior of the casing 2 is provided with an indication section 18 and an operation switch 14. The indication section 18 is on an easily visible surface of the casing 2, and includes of five light emitting elements, in this case light emitting diodes (LED's) 180 through 184, having a cross-like arrangement. The control circuit 50 controls the lighting pattern of the LED's 180 through 184 to indicate whether or not a data symbol 38 is contained within the symbol reading area 36, as well as the direction in which the data symbol 38 protrudes from the symbol reading area 36 (if the data symbol 38 protrudes outside of the symbol reading area 36). The operation switch 14 is, for example, a push button or trigger type switch, and is used to activate the reading function of the data symbol reading device 1.

The reading unit 4 includes two light sources 41, 41, a charge coupled device (CCD) 43 as an image sensing device, an optical system 44, and a supporting member 48. The optical system 44 guides light from the symbol reading area 36 to form an image on the light receiving surface of the CCD 43. In the present embodiment, the light is reflected from the surface of the data symbol 36. The optical system 44 includes a mirror 45 and a lens group 46. The mirror 45 bends the path of the reflected light 47 from the symbol reading area 36 at nearly a right angle. The lens (or lens group) 46, causes the light reflected by the mirror 45 to form an image on the light receiving surface of the CCD 43.

The two light sources 41 illuminate the symbol reading area 36, and are set in a substantially symmetrical manner with respect to the light path 47. A light emitting element such as an LED, a halogen lamp, a semiconductor laser, or the like can be used as the light source 41. A diffuser plate (not shown) with a rough or translucent surface may be installed at the light emitting side of light source 41, in order to make the luminance at the symbol reading area 36 more uniform. The diffuser plate can be formed by roughening a surface of a transparent plate 7 (described later). The light sources 41 are connected to and are controlled by a light source driving circuit 42 in the control circuit 50.

The CCD 43 has many photodiode light receiving (or picture) elements disposed in an array each of the picture elements accumulates an electrical charge corresponding to the amount of light received, and sequentially transfers the charge at a predetermined time. The transferred charges are readable (analog) image signals.

The symbol reading area 36 is, formed on a reference plane 37, representing the surface upon which the data symbol 38 is positioned. The symbol reading area 36 is a predetermined area illuminated by the light source 41. The light reflected from the symbol reading area 36 is sent to the CCD 43. The symbol reading area 36 substantially coincides with or includes the front opening 31 of the housing 3 (described later), and is included in the effective sensing area of the CCD 43.

As shown in FIG. 4, the data symbol 38 consists of a tessellated pattern of black and white cells (alternatively, black and transparent cells) which are arranged in an array. The array has no less than 2 columns (i.e., x columns, where X<1) or rows (i.e., y rows, where y<1) of cells. In this way, each cell can express 0 or 1 in a binary system and information can be specified by a combination of these cells. Furthermore, in the present embodiment, in order to facilitate the outline extraction described later, the four outer edges of the data symbol 38 are preferably outlined by a discernible black edge, the outline 380 (shown in FIGS. 8, 10, and 12). However, the data symbol 38 readable by the data symbol reading device is not restricted to the illustrated arrangement.

The head part 22 of the casing 2 includes a housing 3 extending from the position of the reading unit 4 to the symbol reading area 36. The housing 3 has a rectangular opening 31 opposing the reading unit 4. The housing 3 substantially surrounds both the light path of the illuminating light from the light sources 41, and the light path 47 of the light reflected from the symbol reading area 36. In this embodiment, the housing 3 is rectangular in a cross section parallel to the plane of the symbol reading area 36. The housing 3 maintains the reading unit 4 at a predetermined distance (i.e., a predetermined optical path length) from the symbol reading area 36. The housing 3 length is set to maintain the reading unit 4 at the predetermined distance such that when the front end of the housing 3 comes in contact with the reference plane 37, the light from the symbol reading area 36 will pass through the optical system 44 and form an image on the light receiving surface of the CCD 43.

A transparent plate 7 is installed substantially normal to the light path 47 in the interior of the housing 3 at the inner side of the front opening 31. The transparent plate 7 prevents debris, dirt, and moisture from entering the reading unit 4 and the interior of the casing 2. The transparent plate 7 is installed at a position near the end of the supporting member 48, and partitions the internal space of the housing 3 into a reading unit side space 4a and a front opening side space 4b. The transparent plate 7 can be formed from glass or plastic, and as described above, the transparent plate 7 can also be used as a diffuser for the light sources 41.

The control circuit 50 of the data symbol reading device 1 includes a signal processing circuit 5 for processing the image signals received from the reading unit 4. As shown in FIG. 5, the signal processing circuit 5 includes a CCD driving circuit 6, an amplification circuit 8, a binarization circuit 10, a memory 12, and a central processing unit (CPU) 15 as a control means. The CPU includes a random access memory (RAM) 15a.

The CPU 15 is further connected to the light source driving circuit 42, the communication driver 16, a switch circuit 13 (for the operation switch 14), and the indication unit 18. The power for the device can be supplied, for example, from a host computer.

The CPU 15 controls the light source driving circuit 42 at appropriate times to supply power to the light sources 41, for example, when the operation switch 14 is turned ON. In this embodiment, the lighting duration of the light sources 41 is set to a predetermined time by the light source driving circuit 42 or the CPU 15.

The CPU 15 further activates the CCD driving circuit 6 when the operation switch 14 is turned ON. A horizontal CCD driving pulse and a vertical CCD driving pulse are output from the CCD driving circuit 6 to the CCD 43 to control the accumulation and transfer of charge at the CCD 43.

Clock signals are also generated at the CCD driving circuit 6. For example, composite clock signals, having a horizontal synchronization signal and a vertical synchronization signal combined with a clock signal, are transmitted from the CCD driving circuit 6 to the CPU 15.

The amplification circuit 8 is connected to the CCD 43, and amplifies the (analog) image signals from the CCD 43. The analog image signals are converted into digital image signals (for example, 8-bit image signals) by an A/D converter 9 and then input into the binarization circuit 10.

In the binarization circuit 10, the digital image signals from each picture element are turned into a binary value of "1" or "0" according to predetermined threshold data. A binarized data value of "1" corresponds to a black part of the data symbol 38 while a value of "0" corresponds to a white part. The binarized data output from the binarization circuit 10 are transferred through the CPU 15 and stored in prescribed addresses in the memory 12 by means of an address counter included in the CPU 15. This address counter is driven according to the composite clock signals input from the CCD driving circuit 6.

In operation, the light source driving circuit 45 activates the two light sources 41 to illuminate the symbol reading area 36. Reflected light from the symbol reading area passes through the optical system 44, forming an image on the light receiving surface of the CCD 43. The CCD 43 then outputs image signals (analog signals) corresponding to the amount of light received, which are amplified, binarized, read by the CPU 15, and stored in the memory 12.

Figure 8:
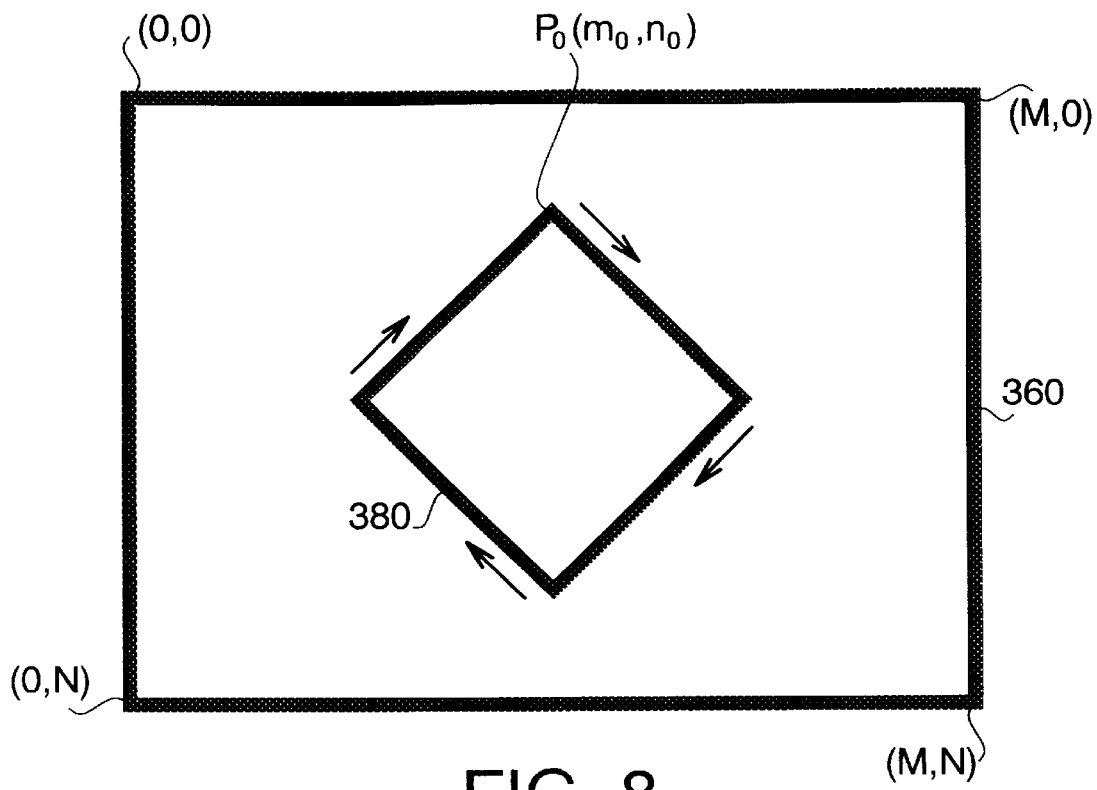
FIG. 8 is a schematic diagram showing a first positional relationship between a symbol reading area, and a peripheral border line of a data symbol image.
Figure 9:
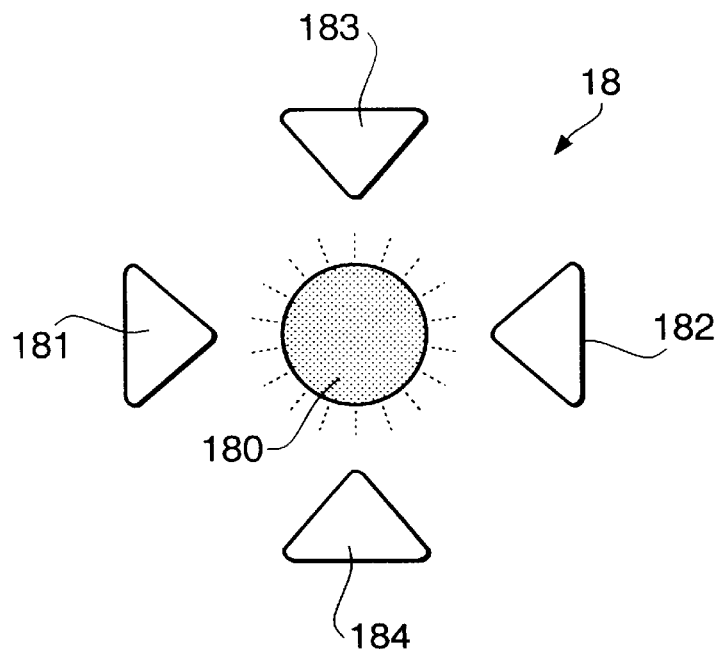
FIG. 9 shows an indicator status corresponding to the first positional relationship shown in FIG. 8.
Figure 10:
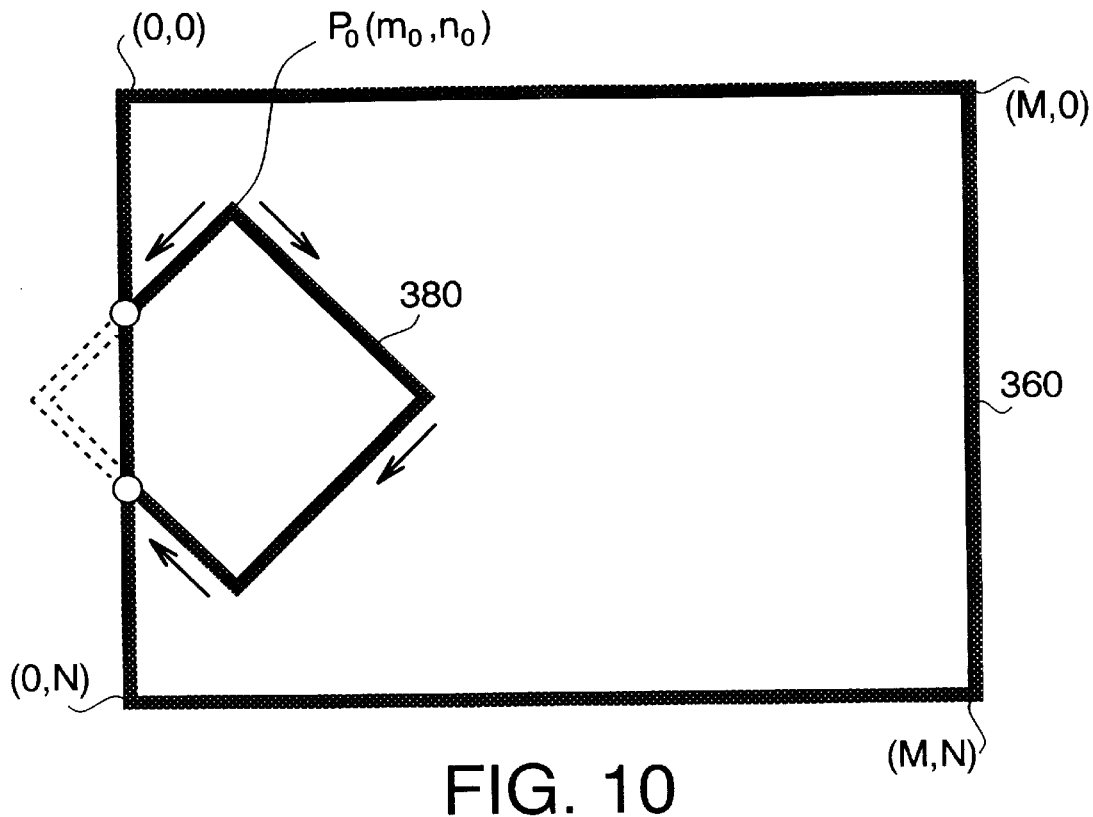
FIG. 10 is a schematic diagram of a second positional relationship between the symbol reading area and the peripheral border line of the data symbol image.
Figure 12:
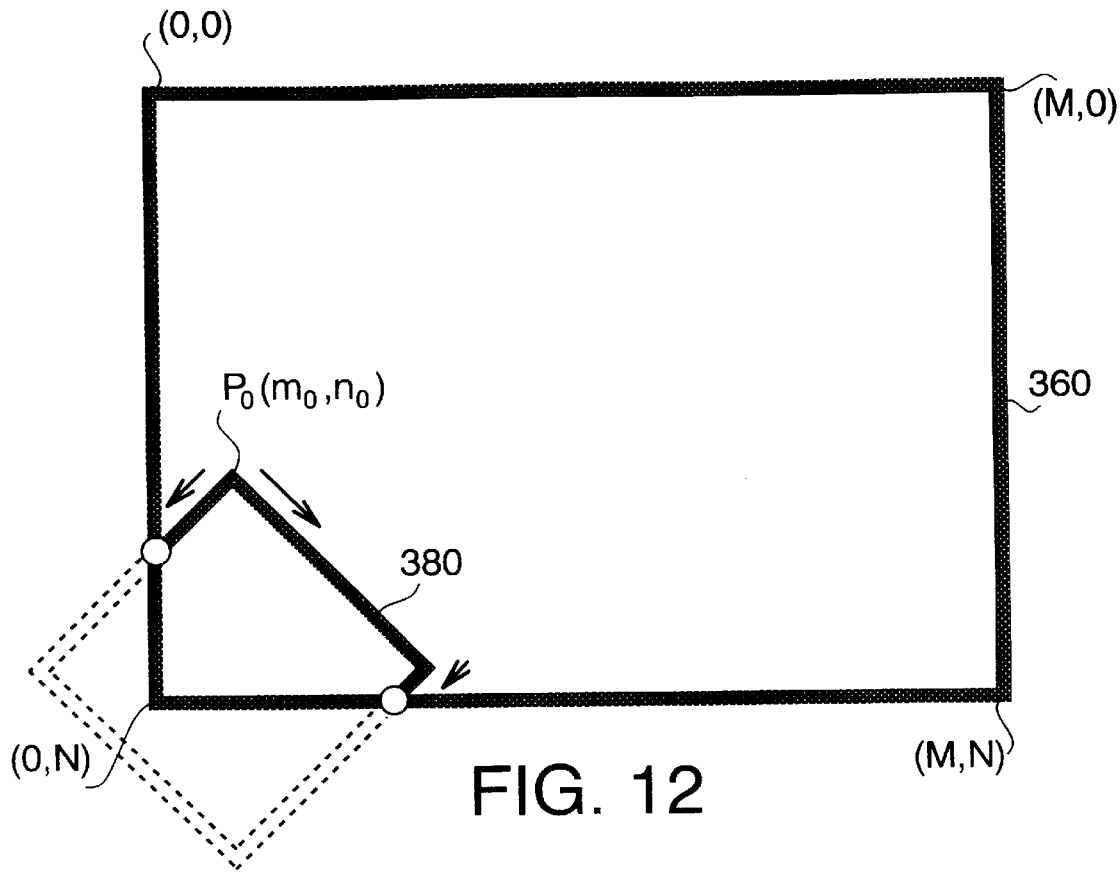
FIG. 12 is a schematic diagram of a third positional relationship between the symbol reading area and the peripheral border line of the data symbol image.

The CPU 15 performs an outline extraction process to extract the outline 380 of the data symbol 38 from the data stored in the memory 12. With reference to FIGS. 8, 10, and 12, in this process, m and n are coordinates within the effective picture element area of the light receiving surface of the CCD 43. The effective picture element area corresponds with the symbol reading area 36. The maximum coordinate in the X direction is M, and the maximumn coordinate in the Y direction is N. Accordingly, $0 \leq m \leq M$ and $0 \leq n \leq N$. The coordinates of the picture elements also correspond to addresses in the memory 12. That is, the binarized data are sequentially written to the memory 12 according to picture element coordinates P(m, n), for example, from P(0, 0) to P(M, 0), then from P(0, 1) to P(M, 1), continuing in this manner until the last line from P(0, N) to P(M, N).

Figure 7A:
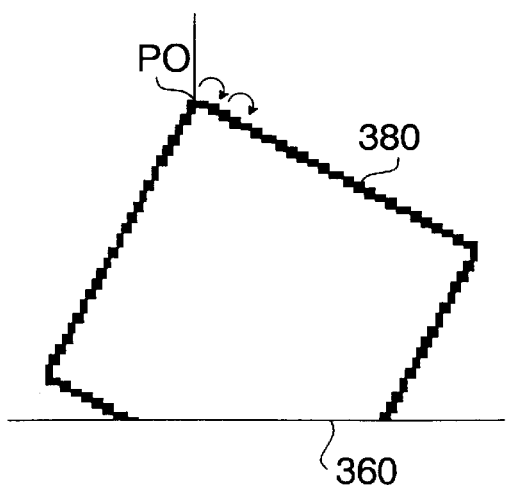
FIGS. 7A through 7D are diagrams showing an outline extraction process for an incomplete outline.

In the outline extraction process, the binarized data stored in the memory 12 are read sequentially as above, for example, from (0, 0) to (M, 0), then from (0, 1) to (M, 1), and so on (as noted above), until the first position (picture element) with a data value of "1" is found. The coordinates of the first picture element having a data value of "1" are then set as the origin $PO(m_o, n_o)$ and stored in the RAM 15a. The data of the surrounding picture elements, i.e., P(m, n−1), P(m+1, n−1), P(m+1, n+1), P(m, n+1), P(m−1, n+1), P(m−1, n), P(m+1, n), P(m−1, n−1) are then checked by the CPU 15 in a clockwise direction, starting at P(m, n−1), the upper middle neighboring picture element, as shown in FIG. 7A. The first surrounding picture element in the clockwise direction having a data value of "1" is recorded in the RAM 15, for example, as $P(m_1, n_1)$ (not shown). The CPU 15 then changes to tho first recorded element $P(m_1, n_1)$, and again checks in a clockwise direction starting at P(m, n−1), and records the subsequent surrounding picture element having a data value of "1", $P(m_2, n_2)$, (not shown). The CPU 15 then changes to this new element $P(m_2, n_2)$, and continues in this fashion. As soon as the CPU 15 detects that no elements having a data value of "1" are on the center upper, center lower, or entire right side of the currently checked element (signifying the right point or edge of the outline 380), the CPU begins checking clockwise from the center right element P(m+1, n) as shown in FIG. 6B. As soon as the CPU 15 detects that no elements having a data value of "1" are on the center right, center left or entire lower side of the currently checked element (signifying the lower point or edge of the outline 380), the CPU 15 begins checking clockwise from the center lower neighboring element P(m, n+1) as shown in FIG. 6C. As soon as the CPU 15 detects that no elements having a data value of "1" are on the center lower, center upper or entire left side of the currently checked element (signifying the left point or edge of the outline 380), the CPU 15 begins checking clockwise from the center left neighboring element P(m−1, n) as shown in FIG. 6D. When a complete outline 380 is within the reading area 31, this process leads back to the recorded origin $PO(m_o, n_o)$, and all the points in the closed loop are traced sequentially and recorded in the RAM 15a.

The coordinates of the picture elements which have a value of "1" form a continuous outline 380 from the origin PO are sequentially stored in the RAM 15a, and the same picture element is not recorded twice in the tracing process (excepting the origin P0, which may be recorded twice).

Figure 7B:
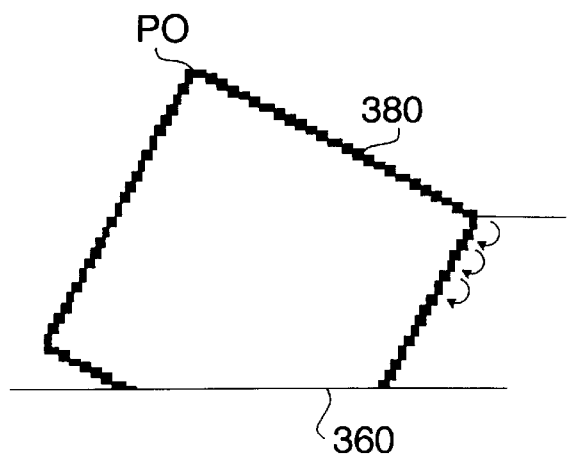
Figure 7C:
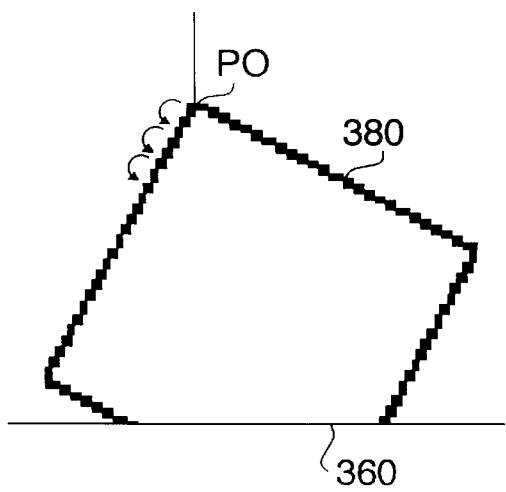
Figure 7D:
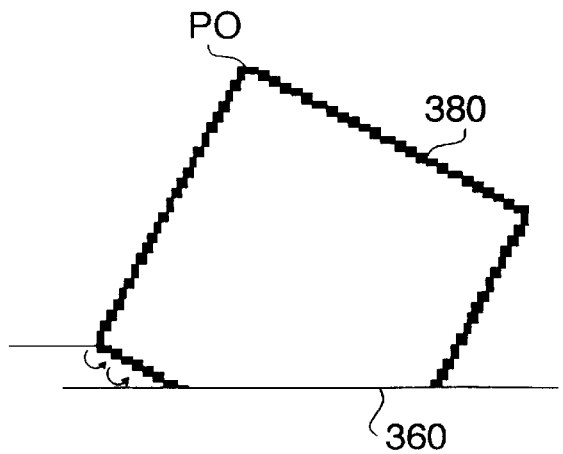

In the case of an incomplete outline 380, as shown in FIGS. 7A through 7B, the process proceeds normally, as shown in FIGS. 7A and 7B, until an edge of the reading area (that is, the outer frame 360) is reached. At this point, when a checked coordinate is outside the reading area, the process returns to the recorded origin $PO(m_o, n_o)$, and begins checking counterclockwise as shown in FIG. 7C, beginning again with the center upper neighboring picture element P(m, n−1). In a process analogous to the clockwise process, as soon as the CPU 15 detects that no elements having a data value of "1" are on the center lower, center upper or entire left side of the currently checked element (signifying the left point or edge of the outline 380), the CPU 15 begins checking counterclockwise from the center left neighboring element P(m−1, n), as shown in FIG. 7D, and so on, analogously to the clockwise process. The process follows the outline as far as possible in the counterclockwise direction. When an edge of the reading area (that is, the outer frame 360) is reached, the process stops recording elements having a data value of "1".

It should be noted that when, for example, the outline 380 protrudes from the upper edge, the process immediately switches to the counter clockwise direction after only one check in the clockwise direction detects the edge of the reading area.

Finally, the coordinates of the picture elements (hereinafter referred to as "border picture elements") that form the full or partial outline 380 of the data symbol 38 are stored in the RAM 15a.

The coordinates of these border picture elements are then read sequentially starting from the origin PO, until a picture element with coordinates coincident with the origin PO is found. If there is a picture element which coincides with the origin PO, then the outline 380 is evaluated as a complete closed rectangular loops as shown in FIG. 8, and the outline extraction process is successful. If there is no picture element which coincides with the origin PO, for example as shown in FIGS. 10 and 12, then the peripheral boundary line 380 is evaluated as incomplete, and the outline extraction process has failed.

The CPU 15 also performs a reading operation to read the encoded data in the symbol 38. In the reading operation, firstly, the binarized data are read sequentially from the memory 12 in accordance with the addresses designated by the address counter (the read order may be reversed with respect to the storage order). The CPU 15 performs any necessary image processing, for example, image inversion, extraction of only binarized data for the data symbol 38 based on the coordinate data of the border picture images, dropout correction, rotation, and the like, are then performed on the binarized data for one image. The CPU 15 also decodes the binarized data into use able data in accordance with the decoding system for the particular type of the data symbol 38. The decoded data is then sent via the communication driver 16 to an externally connected host computer 17. The host computer 17 may be, for example, a personal computer or a work station. The storage, tabulation, and so on of the useable data are then performed on the host computer 17. At the completion of a successful reading operation, the CPU 15 illuminates, or flashes, all the LED's 180, 181, 182, 183, and 184 for a predetermined time (for example, 1 second), and then turns off the LED's 180 through 184.

Figure 14:
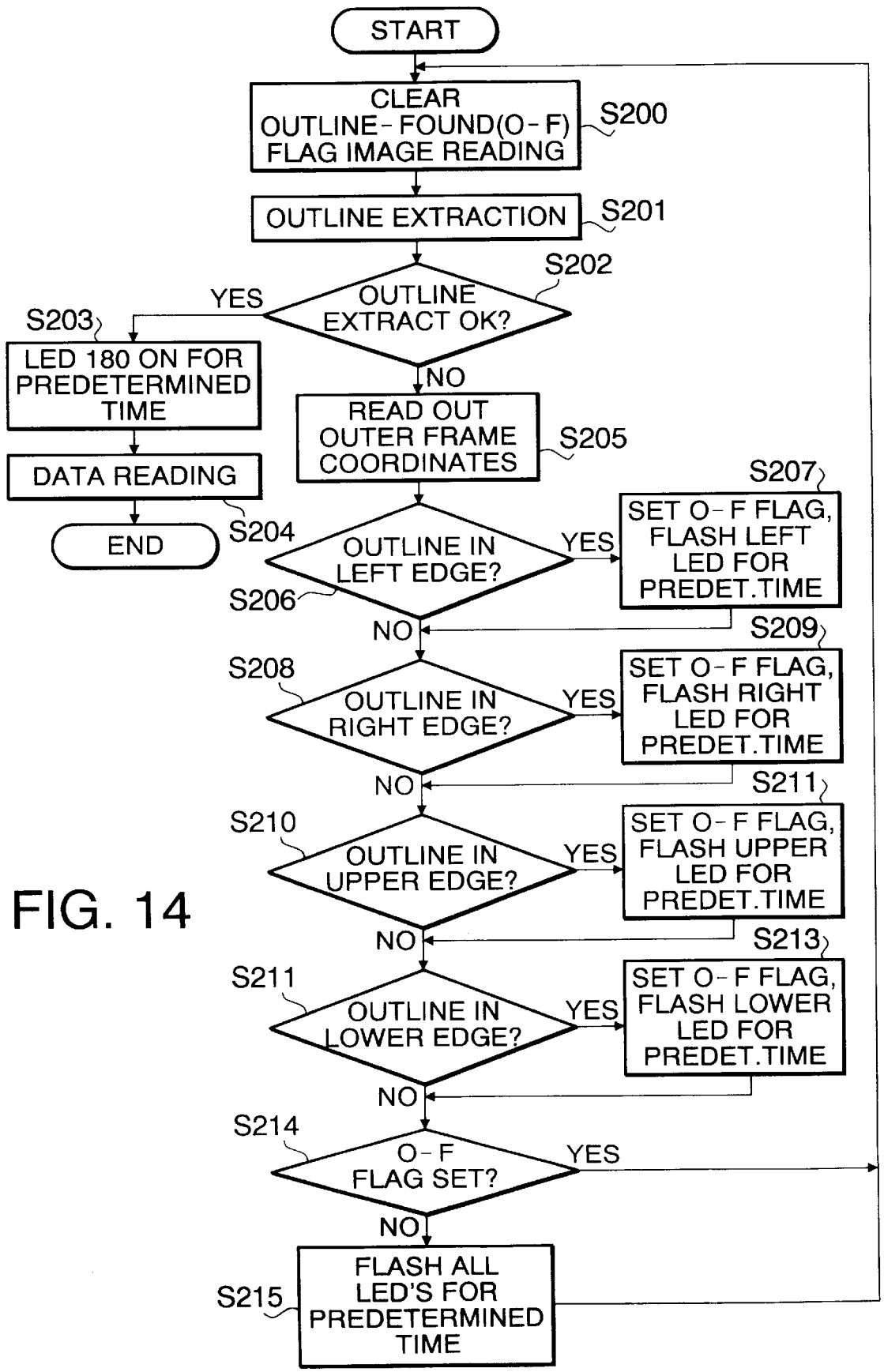
FIG. 14 is a flowchart showing an example of the control operations performed by the data symbol reading device of the embodiment.

The operation of data symbol reading device 1 shall now be described with reference to the flowchart shown in FIG. 14.

The scanning of images starts when the operation switch 14 is turned ON at step S200. To scan the symbol reading area 36, the CPU 15 first instructs the light source driving circuit 42 to turn on the light sources 41. The CPU 15 then activates the CCD driving circuit 6, which instructs the CCD 43 to sequentially output the image signals (analog signals) for one image of the symbol reading area 36 from the reading unit 4. The image signals are amplified by the amplification circuit 8, converted into digital image signals by the A/D converter 9 and then input into the binarization circuit 10. The binarized data output from the binarization circuit 10 are stored in the memory 12. Furthermore, the CPU 15 clears an "outline-found" flag that will be used to record the detection of a coincidence of outline 380 and frame 360 coordinates.

When the binarized data for one image have been stored in the memory 12, the CPU 15 performs the outline extraction process (as previously described) at step S201.

In step S201 (the outline extraction process), if the outline 380 forms a closed rectangular loop as shown in FIG. 8, then the CPU 15 determines that the data symbol 38 has been positioned correctly for reading (Y at step S202). In this case, the CPU 15 instructs the indication unit 18 to light a central LED 180 at step S203, and the reading operation (as previously described) is carried out at step 204.

In step S202, if the peripheral border line 380 of the data symbol 38 does not form a closed loop (as shown in, for example, FIGS. 10 and 12), the CPU 15 determines that a positioning error of the data symbol 38 has occurred (N at step S202), and proceeds to step S205.

In step S205, the coordinate data of the outer frame 360 of the effective picture element urea (as shown in FIGS. 8, 10, and 12) of the light receiving surface of the CCD 43 are read from the RAM 15a. It should be noted that the coordinate data of the outer frame 360 is pre-stored in the RAM 15a, before this process is begun. The coordinate data of the picture elements of the outer-frame 360 are those of the left, upper, right, and lower side edges of the outer frame 360, i.e., from left edge coordinates (0, 0) through (0, N), upper edge coordinates (0, 0) through (M, 0), right edge coordinates (M, 0) through (M, N), and lower edge coordinates (M, N) through (0, N). The CPU 15 then proceeds to step S206.

In steps S206 through S214, all of the coordinates of the border picture elements stored in the RAM 15a (those of the outline 380) are sequentially read starting from the origin PO, and the CPU 15 evaluates if any of these outline coordinates coincide with any of the picture element coordinates of the four edges of the effective picture element area (i.e., the coordinates of the outer frame 360).

Figure 11:
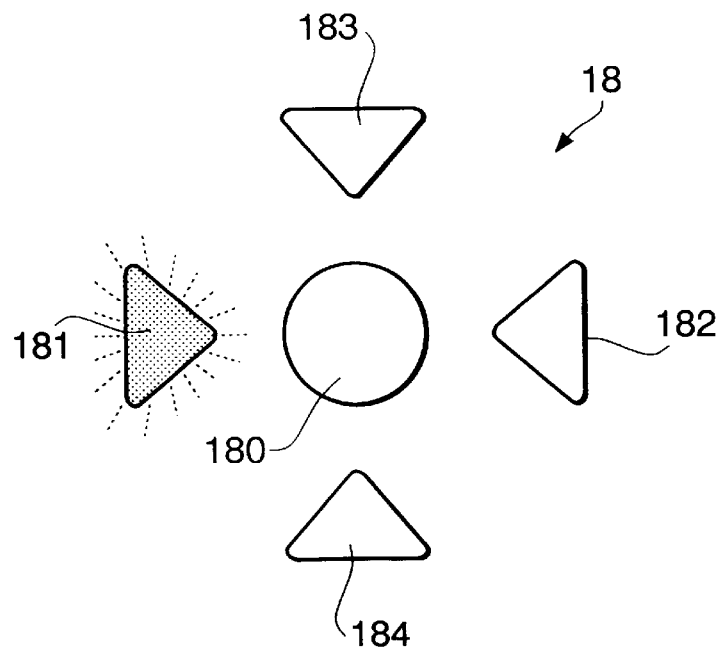
FIG. 11 shows an indicator status corresponding to the second positional relationship shown in FIG. 10.

In step S206, the CPU 15 evaluates if any of the coordinates of the border picture elements stored in the RAM 15a (those of the outline 380) coincide with any of the coordinates (0, 0)–(0, N) of the left edge of the outer frame 360. If there are one or more coordinates of the outline 380 of the data symbol 38 that coincide with the left edge coordinates of the outer frame 360 (Y in step S206), then the outline 380 is therefore protruding in the left direction (as shown in FIG. 10), and in step S207, the CPU 15 sets the outline-found flag, and lights the left LED 181 of the indicator unit 18 as shown in FIG. 11 to notify the operator. After step S207, the process proceeds to step S208.

If no coordinates of the outline 380 coincide with the left edge coordinates of the outer frame 360 (N in step S206), then the process proceeds to step S208. In step S208, the CPU 15 evaluates if any of the coordinates of the border picture elements stored in the RAM 15a (those of the outline 380) coincide with any of the coordinates (M, 0)–(M, N) of the right edge of the outer frame 360. If there are one or more coordinates of the outline 380 of the data symbol 38 that coincide with the right edge coordinates of the outer frame 380 (Y in step S208), then the outline 360 is therefore protruding in the right direction, and in step S209, the CPU 15 sets the outline-found flag, and lights the right LED 182 of the indicator unit 18 to notify the operator. After step S209, the process proceeds to step S210.

If no coordinates of the outline 380 coincide with the right edge coordinates of the outer frame (N in step S208), then the process proceeds to step S210. In step S210, the CPU 15 evaluates if any of the coordinates of the border picture elements stored in the RAM 15a (those of the outline 380) coincide with any of the coordinates (0, 0)–(M, 0) of the upper edge of the outer frame 360. If there are one or more coordinates of the outline 380 of the data symbol 38 that coincide with the upper edge coordinates of the outer frame 360 (Y in step S210), then the outline 380 is therefore protruding in the upper direction, and in step S211, the CPU 15 sets the outline-found flag, and lights the upper LED 183 of the indicator unit 18 to notify the operator. After step S211, the process proceeds to step S212.

If no coordinates of the outline 380 coincide with the upper edge coordinates of the outer frame (N in step S210), then the process proceeds to step S212. In step S212, the CPU 15 evaluates if any of the coordinates of the border picture elements stored in the RAM 15a (those of the outline 380) coincide with any of the coordinates (0, N)–(M, N) of the lower edge of the outer frame 360. If there are one or more coordinates of the outline 380 of the data symbol 38 that coincide with the lower edge coordinates of the outer frame 360 (Y in step S212), then the outline 380 is therefore protruding in the lower direction, and in step S213, the CPU 15 sets the outline-found flag, and lights the lower LED 184 of the indicator unit 18 to notify the operator. After step S213, the process proceeds to step S214.

If no coordinates of the outline 380 coincide with the lower edge coordinates of the outer frame (N in step S212), then the process proceeds to step S214.

In step S214, each of the four directions has been checked, and if at least one edge of the outer frame 360 has coordinates that coincide with those of the outline 380, the outline-found flag has been set. Accordingly, in step S214, the CPU 15 checks if the outline-found flag has been set. If the flag is set (Y at step S214), then at least one edge of the frame 360 has coordinates coinciding with those of the outline 380, and at least one of LED of LED's 181 through 184 has been flashed, and the process proceeds back to the beginning at step S200. If the flag is not set (N at step S214), then both the outline extract has failed at step S202 and no coordinate of the outer frame 360 has coordinates coinciding with those of the outline 360, and the CPU 15 evaluates that the data symbol 38 is not within the symbol reading area 36, proceeds to step S215, and lights all the LED's 180 through 184 to notify the operator. The CPU 15 returns to the beginning of the process at step S200 after the execution of step S215 (or step S214 as noted) and the procedure is repeated until the data symbol 38 is correctly read.

Figure 13:
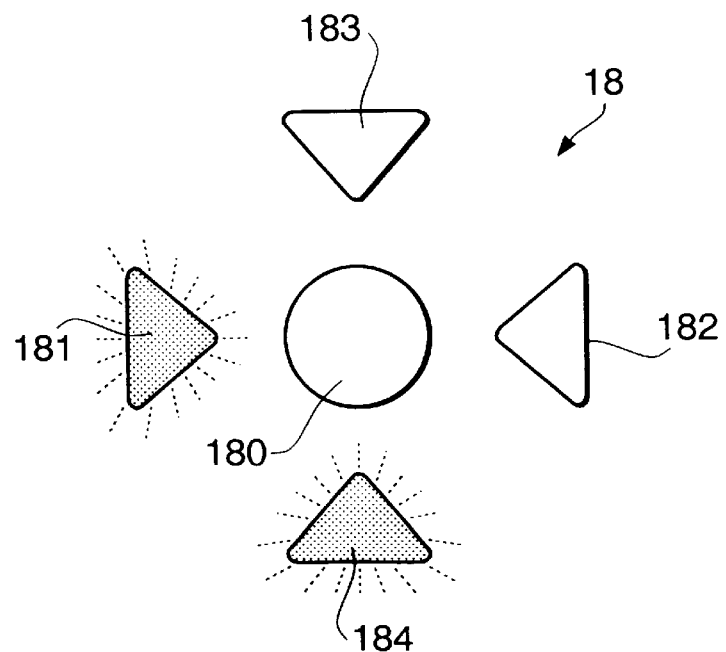
FIG. 13 shows an indicator status corresponding to the third positional relationship shown in FIG. 12.

Through the process described above, the central LED 180 lights up when the data symbol 38 is fully within the symbol reading area 36, while at least one of the LEDs 181 through 184 light to indicate the direction in which the data symbol 38 protrudes outside the symbol reading area 36. Furthermore, if the data symbol 38 is entirely outside the symbol reading area 36, all LEDs 180 through 184 light to notify the operator of this condition. Thus, the operator is notified of the positioning condition. Alternatively, using the same flow control, the CPU 15 and durations of the predetermined times for which the LED's are flashed are configured such that when the data symbol 38 protrudes in two of the upper, lower, left, or right directions (the left and lower directions being shown in FIG. 12), both of the directions are indicated (as shown with the left and lower LED's 181 and 184 in FIG. 13).

Thus, the operator is given helpful positioning information. That is, if the data symbol 38 is entirely outside or protruding outside the symbol reading area 36, the fact that the symbol 38 is entirely outside, or the direction of protrusion, are indicated to the operator immediately through the indication unit 18. The operator can then easily and rapidly perform a positional correction with regard to the data symbol 38. Accordingly, data symbol reading errors can thus be prevented and the accuracy of reading can be improved.

It should be noted that alternative embodiments can be constructed without departing from the spirit or scope of the invention. For example, instead of using the outline 380 of a symbol, a predetermined arrangement of data blocks in the symbol can be used to define the symbol footprint. Furthermore, instead of comparing each black pixel of a symbol outline 380 with coordinates of the outer frame 360, pixel locations representing the outline 380 of the symbol footprint can be compared with the outer frame 360 coordinates. Still further, a set of coordinates logically defined by the footprint of the symbol 38 (defined by the outline 380 or otherwise defined by pattern recognition) can be logically compared with a set of similarly defined outer frame 360 coordinates in a greater-than/less-than fashion to check whether they coincide.

Further alternatively, the outer frame 360 can be checked for black pixels at least once before the outline extraction process is performed. Still further alternatively, the outline extraction can be skipped entirely, and the outer frame 360 can be checked for black pixels by executing steps similar to steps S206 through S215 carried out to locate identified black pixels.

Although a specific embodiment of a data symbol reading device has been described to illustrate the invention, the invention is not limited to this specific embodiment. For example, the shape of the symbol reading area 36 may be, alternatively, a polygonal shape (such as a triangular, hexagonal, or octagonal shape), a circular shape, an elliptical shape, or any other shape, The present disclosure relates to subject matter contained in Japaneae Patent Application No. HEI 07-159924, filed on Jun. 2, 1995, which is expressly incorporated herein by reference in its entirety.

What is claimed is:

1. A data symbol reader, comprising:

a reading unit, said reading unit including an image sensing device and an optical system, said optical system forming an image of a two-dimensional data symbol on said image sensing device when said two-dimensional data symbol is in a symbol reading area of said data symbol reading device;

evaluating means for evaluating if an entirety of said two-dimensional data symbol is within said symbol reading area based on the output of said image sensing device, said evaluation means evaluates if the entirety of a two-dimensional data symbol is within the symbol reading area by processing image signals received from the reading unit, storing the processed image signals in a memory, and extracting an outline of the data symbol from the image signals stored in the memory, wherein, if the extracted outline of the two-dimensional data symbol is a closed loop, the symbol is determined to be within the symbol reading area, and if the extracted outline is not a closed loop, the two-dimensional data symbol is determined to protrude from the symbol reading area, wherein outline extraction starts from a predetermined element of the outline of the two dimensional data symbol, detects adjacent elements of the outline in a first predetermined direction, and determines that a closed loop outline of the data symbol has been detected when repeated detection of adjacent elements in the predetermined direction results in detection of said predetermined element;

recognizing means for recognizing a direction in which said two-dimensional data symbol protrudes from said symbol reading area, when said two-dimensional data symbol protrudes outside said symbol reading area;

a control system, said control system comprising said evaluating means and said recognizing means;

an indicator, responsive to said evaluating means, for indicating whether the entirety of said two-dimensional data symbol is within said symbol reading area; and wherein a direction in which said two-dimensional data symbol protrudes from the symbol reading area is evaluated based on an intersection of an outline of the two-dimensional data symbol image formed on the image sensing device and an outer frame of an effective picture element area of the image sensing device.

2. The data symbol reader according to claim 1, wherein said evaluating device includes:

outline extracting means for extracting an outline of said data symbol image formed on said image sensing device; and wherein said evaluating device evaluates that said data symbol is contained within said symbol reading area when said extracted outline forms a closed loop, and wherein said evaluating means evaluates that said data symbol is not within said symbol reading area when said extracted outline does not form a closed loop.

3. The data symbol reader according to claim 1, comprising:

wherein said indicator comprises;

direction indicators, responsive to said recognizing means, for indicating the direction in which said symbol protrudes from said symbol reading area.

4. The data symbol reader according to claim 1, wherein protrusion of the two-dimensional data symbol from the reading area is detected when, during outline extraction, an edge of the reading area is reached, extraction is restarted from said predetermined element, adjacent elements are detected in a direction opposite to the predetermined direction, and an edge of the reading area is again reached.

5. The data symbol reader according to claim 1, wherein said evaluating means determines that the two-dimensional data symbol protrudes from the symbol reading area upon detection of two intersections of an outline of the two-dimensional data symbol with an outline of the reading area.

6. The data symbol reader according to claim 5, wherein one of said intersections is determined by following the outline of said two-dimensional data symbol in a first direction from a predetermined origin position, and a second of said intersections is determined by following the outline of said two-dimensional data symbol in a direction opposite to the predetermined direction from the predetermined origin position.

7. The data symbol reader according to claim 5, said two intersections defining a protrusion direction of said two-dimensional data symbol.

8. A data symbol reader, comprising:

an imaging system that forms an image of a two dimensional data symbol, said imaging system having an outer frame defining an effective reading area, a control system, said control system comprising evaluating means for evaluating if a portion of a formed image of the two-dimensional data symbol protrudes from said outer frame defining said effective reading area; said evaluating means including direction detecting device for detecting a direction in which said portion of said formed image of the two-dimensional data symbol protrudes from the symbol reading area based on an intersection of the portion of the formed image and the outer frame defining the effective reading area, and an indicator, responsive to said means for evaluating, for indicating whether said formed image of the two-dimensional data symbol intersects with said outer frame defining said effective reading area, said evaluating means determines that said two-dimensional data symbol protrudes from the outer frame of the symbol reading area upon detection of two intersections of an outline of the two-dimensional data symbol with the outer frame of the symbol reading area, one of said intersections being determined by following the outline of said two-dimensional data symbol in a first direction from a predetermined origin position, and a second of said intersections being determined by following the outline of said two-dimensional data symbol in a direction opposite to the predetermined direction from the predetermined origin position.

9. The data symbol reader according to claim 8, wherein said indicator includes:

a plurality of direction indicators, responsive to said direction detecting means, for indicating said directions in which said portion of said formed image protrudes from said outer frame defining said effective reading area.

10. The data symbol reader according to claim 9, wherein said direction detecting device includes:

a memory for storing image information of at least a portion of said formed image;

a memory for storing frame information, according to said directions, of said outer frame defining said effective reading area; and means for comparing said image information and said frame information.

11. The data symbol reader according to claim 10, wherein said image information includes image coordinates, and wherein said frame information includes frame coordinates.

12. The data symbol reader according to claim 9, wherein said direction detection means detects one or two directions in which said portion of said formed image of said data symbol protrudes from said outer frame defining said effective reading area, and wherein said plurality of direction indicators indicates at least one direction in which said portion of said formed image protrudes from said outer frame defining said effective reading area.

13. The data symbol reader according to claim 8, wherein said portion of said formed image of said data symbol is an outline of said data symbol.

14. The data symbol reader according to claim 13, wherein said evaluating device includes:

means for extracting information defining said outline of said data symbol from said formed image of the data symbol.

15. The data symbol reader according to claim 14, wherein said evaluating means further evaluates whether said extracted information defining said outline of said data symbol defines a complete outline of said data symbol.

16. The data symbol reader according to claim 15, wherein said evaluating means evaluates whether said extracted information defining said outline of said data symbol defines a complete outline of said data symbol by evaluating if said outline of said symbol defines a closed loop.

17. The data symbol reader according to claim 8, wherein said evaluating device further evaluates whether all portions of said formed image of the data symbol are within said outer frame defining said effective reading area; and wherein said indicator further indicates when all portions of said formed image of the data symbol are within said outer frame defining said effective reading area.

18. The data symbol reader according to claim 17, wherein said evaluating device further evaluates whether all portions of said formed image of the data symbol are outside said outer frame defining said effective reading area; and wherein said indicator further indicates when all portions of said formed image of the data symbol are outside said outer frame defining said effective reading area.

19. The data symbol reader according to claim 8, said two intersection defining a protrusion direction of said two-dimensional data symbol.

20. The data symbol reader according to claim 8, said evaluating means evaluating if a portion of the formed image of the two-dimensional data symbol protrudes from the outer frame by extracting an outline of the two-dimensional data symbol, said outline extraction starts from a predetermined element of the outline of the two dimensional data symbol, detects adjacent elements of the outline in a first predetermined direction, and detects that a closed loop outline of the data symbol has been detected when repeated detection of adjacent elements in the predetermined direction results in detection of said predetermined element, detection of a closed loop outline determining that the two-dimensional data symbol does not protrude from the outer frame.

21. A data symbol reader, comprising:
   an imaging sensor for reading an image of an effective reading area defined by an outer frame;
   an imaging optical system for forming said image on said imaging sensor;
   a memory;
   a controller that receives said image from said imaging sensor, stores first information representing said image of said effective reading area and second information representing a data symbol image portion of said image in said memory, said controller evaluating a direction in which said data symbol image portion of said image intersects with said outer frame; and
   an indicator having directional indications, said indicator controlled by said controller, that indicates said direction in which said data symbol image portion of said image intersects with said outer frame,
   said controller determining that the two-dimensional data symbol protrudes from the symbol reading area upon detection of two intersections of an outline of the data symbol with an outline of the effective reading area, one of said intersections being determined by following the outline of said two-dimensional data symbol in a first direction from a predetermined origin position, and a second of said intersections is determined by following the outline of the two-dimensional data symbol in a direction opposite to the predetermined direction from the predetermined origin position.

22. The data symbol reader according to claim 21, wherein said first information include outer frame coordinates, and wherein said second information includes outline information of said data symbol image portion.

23. The data symbol reader according to claim 22, wherein said outline information includes outline coordinates of said data symbol image portion.

24. The data symbol reader according to claim 23, wherein said controller evaluates said direction in which said data symbol image portion of said image intersects with said outer frame by comparing said outer frame coordinates with said outline coordinates.

25. The data symbol reader according to claim 21, wherein said controller further evaluates whether said data symbol image portion forms a complete data symbol, and only evaluates said direction in which said data symbol image portion of said image intersects with said outer frame if said data symbol image portion forms a complete data symbol.

26. The data symbol reader according to claim 25, wherein said controller further evaluates whether said data symbol image portion is outside said outer frame; and
   wherein said indicator further indicates when said data symbol image portion is outside said outer frame.

27. The data symbol reader according to claim 21, said two intersections defining a protrusion direction of said data symbol.

28. The data symbol reader according to claim 21, said controller determining if the two-dimensional data symbol protrudes from the symbol reading area by extracting an outline of the two-dimensional data symbol, said outline extraction starts from a predetermined element of the outline of the two-dimensional data symbol, detects adjacent elements of the outline in a first predetermined direction, and detects that a closed loop outline of the data symbol has been detected when repeated detection of adjacent elements in the predetermined direction results in detection of said predetermined element, detection of a closed loop outline determining that the two-dimensional data symbol does not protrude from the symbol reading area.

29. A method of determining if a two-dimensional data symbol is entirely within a symbol reading area of a data symbol reader, the data symbol reader including a reading unit having an image sensing device and an optical system which forms an image of the two-dimensional data symbol on the image sensing device when the two-dimensional data symbol is in the symbol reading area of the data symbol reading device, the method comprising:
   evaluating if an entirety of the two-dimensional data symbol is within the symbol reading area based on the output of the image sensing device, the evaluating being performed by:
   extracting an outline of the two-dimensional data symbol;
   determining if the outline intersects with an outer frame of the image sensing device corresponding to the symbol reading area of the data symbol reader by sequentially checking coordinates of the outline;
   determining that the entirety of the two-dimensional data symbol is within the symbol reading area if the outline does not intersect with the outer frame and that the two-dimensional data symbol protrudes from the symbol reading area upon detection of two intersections of the outline with the outer frame, one of the intersections being determined by following the outline of the two-dimensional data symbol in a first direction from a predetermined origin position and a second of the intersections being detected by following the outline of the two-dimensional data symbol in a direction opposite to the predetermined direction from the predetermined origin position; and
   indicating, responsive to the evaluating, whether the entirety of the data symbol is within the symbol reading area.

30. The method of determining according to claim 29, further comprising determining that the two-dimensional data symbol protrudes from the symbol reading area upon detection of two intersections of the outline of the two-dimensional data symbol with an outline of the reading area.

31. The method of determining according to claim 30, a protrusion direction being determined by said two intersection.

32. The method of determining according to claim 29 wherein outline extraction starts from a predetermined element of the outline of the two dimensional data symbol, detects adjacent elements of the outline in a first predetermined direction, and detects that a closed loop outline of the data symbol has been detected when repeated detection of adjacent elements in the predetermined direction results in detection of said predetermined element, detection of a closed loop outline determining that the two-dimensional data symbol does not protrude from the symbol reading area.

* * * * *